Jan. 29, 1929.  1,700,379
A. H. SKAER ET AL
REVERSIBLE MOTOR
Filed Sept. 12, 1922  3 Sheets-Sheet 1
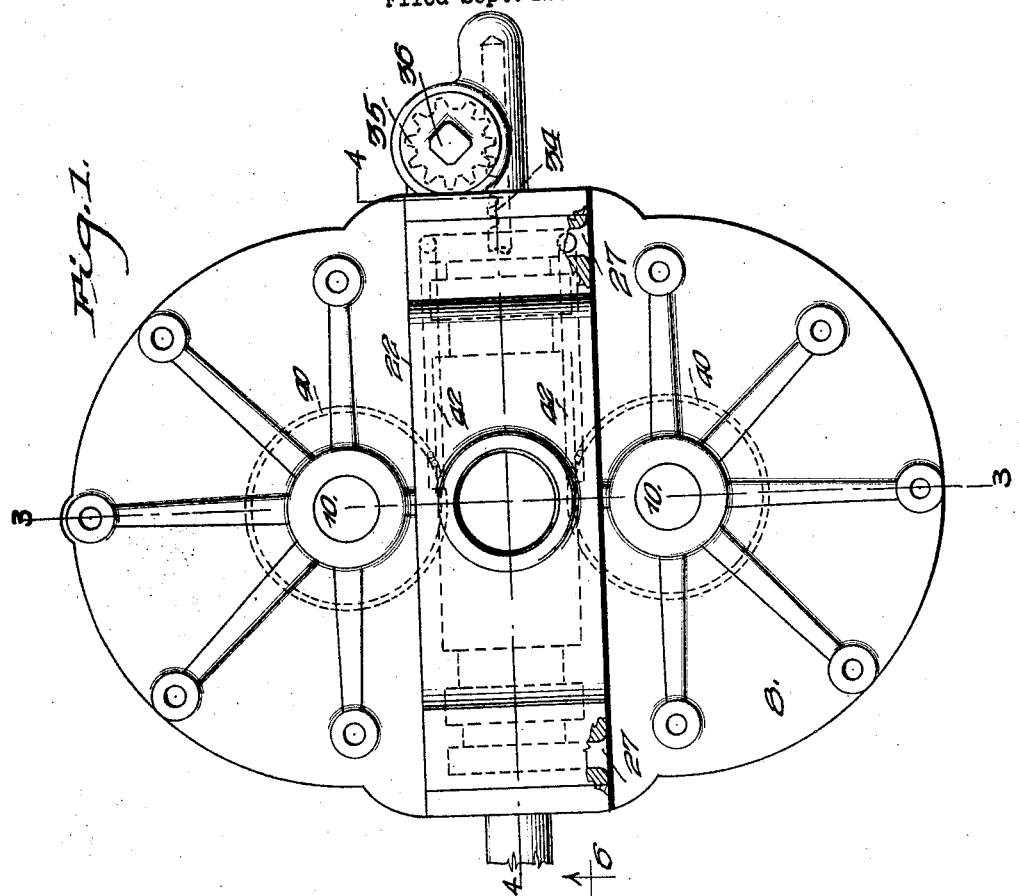
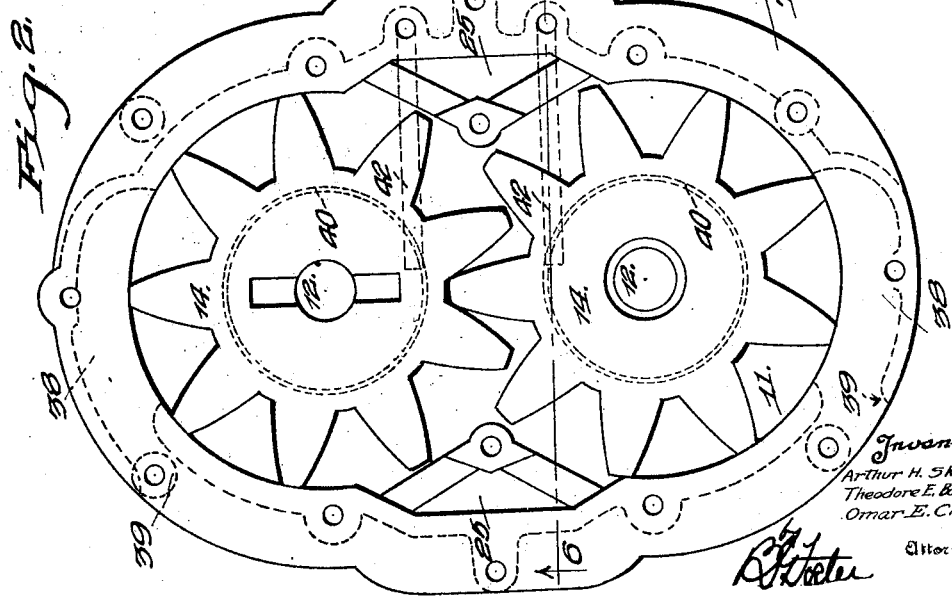
Inventors
Arthur H. Skaer
Theodore E. Barker
Omar E. Clark
Attorney

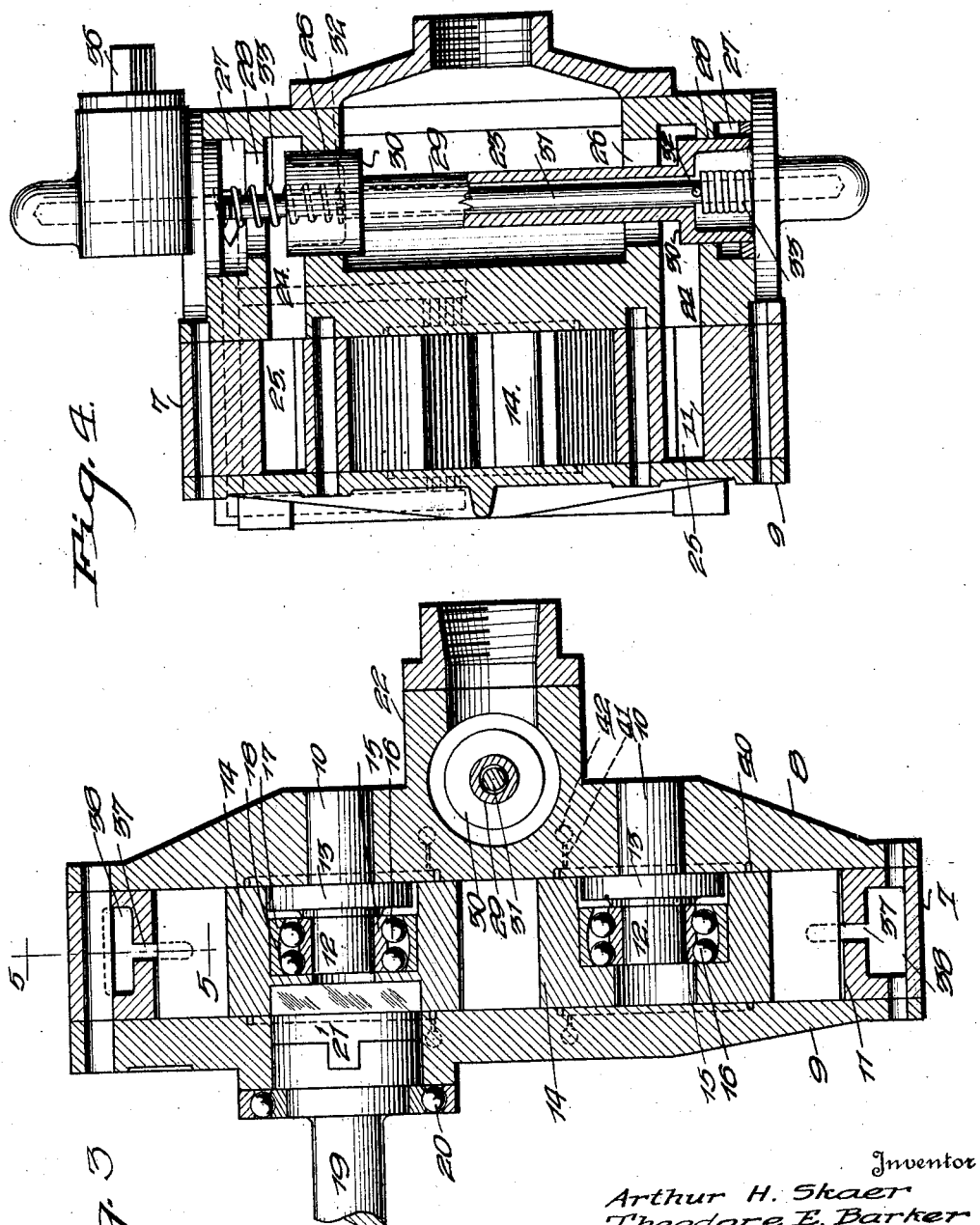

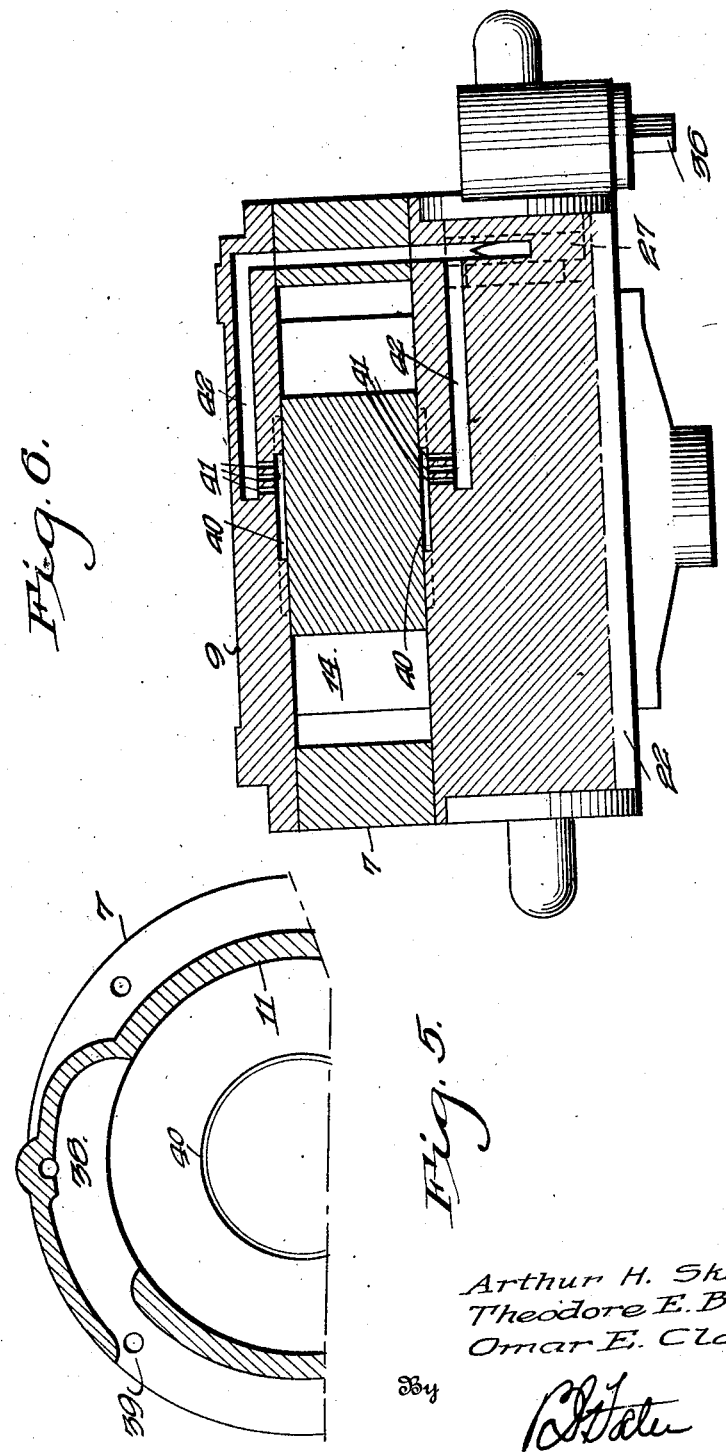

Patented Jan. 29, 1929.

1,700,379

UNITED STATES PATENT OFFICE.

ARTHUR H. SKAER, THEODORE E. BARKER, AND OMAR E. CLARK, OF DENVER, COLORADO, ASSIGNORS, BY MESNE ASSIGNMENTS, TO THE GARDNER-DENVER COMPANY, OF QUINCY, ILLINOIS, A CORPORATION OF DELAWARE.

REVERSIBLE MOTOR.

Application filed September 12, 1922. Serial No. 587,804.

The present invention relates to rotary motors, and is especially adapted for the utilization of compressed air, as the motive fluid, though not necessarily limited to that fluid as the actuating force.

One of the objects is to provide a simple and practical motor that is exceedingly compact, and in which resistance due to friction and back pressure is eliminated to a very great extent, thereby decidedly increasing the power.

In the accompanying drawings:—

Figure 1 is a view in elevation of the preferred embodiment of the invention,

Figure 2 is a view with the head removed,

Figure 3 is a cross sectional view on the line 3—3 of Figure 1,

Figure 4 is a sectional view at right angles to Figure 3 or on the line 4—4 of Figure 1, Figure 5 is a detail sectional view taken substantially on the line 5—5 of Figure 3, Figure 6 is a detail sectional view taken on the line 6—6 of Figure 2.

In the embodiment disclosed, a cylinder member is employed, comprising a body ring 7 and removable heads 8 and 9. One of the heads has fixed therein spaced studs 10 that project into the piston chamber 11 formed by the assembly of the parts, providing journal posts 12. These studs preferably have flanges 13 that abut against the inner face of the head 8, providing an extended bearing or base. Journaled on the studs are intermeshing gear pistons 14. The journal bearings are preferably constructed as follows. A race ring 15 is mounted on each stud and is provided with spaced annular grooves for the reception of balls 16. Fixed internally in each piston is a race ring 17 having a transversely concaved annular bearing surface 18 for said balls. Anti-friction bearings are thus provided for the pistons and these bearings permit the pistons to have lateral revoluble play so that no binding action will take place due to inaccuracies of machine work or misalignment of the parts. A portion of a driving shaft is shown at 19 and is aligned with one of the studs 10. It is provided with a ball bearing 20 in the head 9, and thus has a mounting independent of the adjacent piston 14. Interposed between and connecting the said shaft and the adjacent piston is a universal or floating coupling 21, which thus allows the necessary play between the piston and the shaft.

The head 8 is provided with an enlargement forming a valve casing, designated 22, said casing having a central internal motive fluid supply-receiving chamber 23. The casing is furthermore provided at opposite ends of the chamber 23 with passageways 24 that open into the piston chamber 11 through ports 25 that are arranged on opposite sides of the intermeshing portions of the pistons 14. Communication between the ends of the chamber 23 and the passageways 24 is established through ports 26. Exhaust-permitting passages 27 open to atmosphere are in communication with the passageways 24 through ports 28 aligned with the ports 26. A reciprocatory plunger valve 29 extends across the chamber 23 and has heads 30 that are adapted to enter and close the ports 26 and 28, as will be clear by reference to Figure 4. Slidably extending through the plunger valve 29 is an actuating rod 31 having cross pins 32 that are adapted to abut against the ends of said valve. Coiled springs 33 are located on the ends of the actuating rod and are adapted to normally center said valve. The rod 31 is provided at one end with a rack 34 engaged by a pinion 35 on an operating shaft 36, the square end of which is exposed and is adapted to be engaged by a suitable handle.

The body ring 7 of the cylinder member is provided at its ends with elongated internal slots 37 opening through its inner face, which slots are traversed by the teeth of the gear pistons. These slots communicate with chambers 38 that are open to atmosphere, as indicated at 39, and thus auxiliary exhaust channels are provided as hereinafter explained.

Relief channels 40 are preferably cut in the inner faces of the heads 8 and 9 around the axes of rotation of the pistons and from said channels ports 41 open into passageways 42 that lead to the exhaust chambers 27.

Assuming the plunger valve 29 released, the springs 33 will center the same so that the heads 30 close both supply ports 26 and motive fluid in the chamber 23 is thus cut off from the piston chamber 11. If now the actuating rod 31 is moved in one direction, as shown in Figure 4, the valve 29 will be correspondingly moved, thus retaining one of the supply ports 26 closed, but opening the adjacent exhaust port 28 at the same time opening the opposite supply port 26 and closing its associated exhaust port 28. Motive fluid will thus flow from the chamber 23 through one of the passageways 24 into the piston chamber, while exhaust can take place through the other passageway 24, port 28 and outlet 27. The motor will thereby be driven in one direction and reversing the movement of the valve will effect the reversal of the motor.

In operation, it has been found that the provision of the slots 37 very materially increases the power of the motor by providing an auxiliary exhaust and also decidedly decreases the noise of the exhaust, which has been found to be a very material advantage. The mounting of the pistons has also been found to be a decided advance, for notwithstanding the most careful and accurate machining of the parts there is apt to be some binding action, creating material resistance and this resistance has been reduced with a consequent increase in power. The same is true of the employment of the relief channels 40, which prevent the leakage past the face of the rotors to the inner bearings, preventing building up pressure around said center bores.

From the foregoing, it is thought that the construction, operation, and many advantages of the herein described invention will be apparent to those skilled in the art without further description, and it will be understood that various changes in the size, shape, proportion and minor details of construction may be resorted to without departing from the spirit or sacrificing any of the advantages of the invention.

Having thus fully described our invention, what we claim as new, and desire to secure by Letters Patent, is:—

1. In a rotary engine, the combination with a cylinder member having a rotor chamber and end walls, of a stud fixed to one end wall and projecting into the chamber, a rotor journaled on the stud, a bearing member for the rotor mounted on the stud that permits said rotor to have lateral revoluble play on the stud, and a driving shaft coaxial with the stud and projecting from the other end wall and having a driving connection with the rotor.

2. In a rotary engine, the combination with a cylinder member having a rotor chamber and end walls, of a stud fixed to one end wall and projecting into the chamber, said stud terminating short of the other end wall, a rotor in the chamber and fitted between the end walls, said rotor being journaled on the stud, and a driving shaft journaled in the other end wall in line with the stud and having a connection with the end of the rotor beyond the inner end of the stud.

3. In a rotary engine, the combination with a cylinder member having a rotor chamber and end walls, of a stud fixed to one end wall and projecting into the chamber, said stud terminating short of the other end wall, a rotor in the chamber and fitted between the end walls, said rotor being journaled on the stud, a driving shaft in line with the stud and spaced from the inner end thereof, and a universal coupling connecting the inner end of the shaft and the adjacent end of the rotor and being located between said shaft and the inner end of the stud.

4. In a rotary engine, the combination with a cylinder member having a rotor chamber and end heads therefor, studs fixed to one of the end heads and projecting into the chamber, a shaft extending to the other end head in line with one of the studs, intermeshing gear pistons journaled on the studs within the piston chamber and having bearings thereon that permit their lateral revoluble play, and a universal coupling between the shaft and the piston that is journaled on the stud alined therewith.

In testimony whereof, we affix our signatures.

ARTHUR H. SKAER.
THEODORE E. BARKER.
OMAR E. CLARK.